July 10, 1923.  1,461,571

E. F. W. ALEXANDERSON

CONTROL SYSTEM

Filed March 23, 1920  4 Sheets-Sheet 1

Inventor:
Ernst F. W. Alexanderson,
by His Attorney.

Inventor:
Ernst F. W. Alexanderson,
by his Attorney.

July 10, 1923.

E. F. W. ALEXANDERSON

CONTROL SYSTEM

Filed March 23, 1920  4 Sheets-Sheet 3

Inventor:
Ernst F.W. Alexanderson,
by His Attorney.

Fig. 7.

Patented July 10, 1923.

1,461,571

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

CONTROL SYSTEM.

Application filed March 23, 1920. Serial No. 368,196.

*To all whom it may concern:*

Be it known that I, ERNST F. W. ALEXANDERSON, a citizen of the United States, residing at Schenectady, county of Schenectady, State of New York, have invented certain new and useful Improvements in Control Systems, of which the following is a specification.

This invention relates to the control of alternating current installations wherein a motor load is supplied from a source of alternating current, and wherein conditions may arise where the motor may be loaded to such an extent as to cause it to fall out of step. It is highly desirable to ascertain how close the motor is operating to the point where it would be no longer able to increase its torque. From such an indication, the operator knows that it is necessary for him to take the proper corrective steps, so as to bring the motor back to its stable range. On the other hand, the motor may be too stable, which may be almost as undesirable as the contrary condition. When the motor is too stable, the efficiency of the motor is apt to be much below its maximum, and the field on the alternator may overheat. It is, therefore, advisable to operate the motors close, but not dangerously so, to the point where they would drop their load upon an attempt to increase their torque. This range, in which it is shown that it is advisable to have the motor operate may be termed the stable range, and in the following discussions, that meaning is ascribed to the term.

For the sake of simplicity, let us investigate the case of an ordinary induction motor which is supplied as the sole load of an alternating current generator. The point of the torque curve at which the motor will operate is dependent upon the speed torque characteristic of the load as well as upon the speed torque characteristic of the motor. The point of intersection of these two characteristics determine the point of operation of the motor under those conditions. Whether or not this point of operation is stable is determined by the shapes of the two speed torque curves. In an ordinary induction motor, the stable range is usually located between the maximum torque point and synchronism. If the speed torque characteristic of the load is such that it has an ascending slope at the point of intersection, then the motor is stable thereat. This results from the following consideration:—Should the speed drop for any reason whatsoever, the torque required by the load is correspondingly reduced. The reduction in required torque, however, causes the speed of the motor to increase in response to the motor characteristics. The increase of speed can bring the speed back to the original speed only, because a greater speed would require more torque to drive the load than the motor could furnish at the increased speed.

From another standpoint, stability conditions and stability range may be investigated with respect to the power consumed by the motor. If the motor is gradually loaded up to the point of short circuit and the terminal voltage plotted as a function of the current, leaving the excitation of the alternator constant, the maximum power expended in the motor occurs about halfway between short circuit and open circuit of the alternator supplying the load. Attempts to increase the load beyond the maximum will cause an increase in the current flow, but a much more rapid decrease in applied E. M. F. so that the net result will be a decrease in the power supplied, assuming that the power factor is constant. This analysis is applicable to synchronous motors as well as to induction motors. It is highly desirable that motors operate at such a point of their current-voltage characteristics, that a further small increase of current will cause an increase in the power, otherwise the motor will drop its load. On the other hand, too great stability may also be objectionable for the reasons that have already been pointed out.

It is the object of this invention to make it possible, at all times, to operate the motors near their maximum output points for a definite excitation of the alternator, that is, within their so-called stable range. This operation may be manual or automatic, but in either case there is utilized an instrument which may be termed a stability indicator. This instrument is so arranged that when the machine departs from its maximum power output point, the needle upon the instrument indicates that the machine is operating on too stable a point or it is in danger of falling out of step. Such instruments and regulating means are found useful in ship propulsion installations wherein the alternator excitation is adapted to be varied by hand in response to load or torque conditions and wherein such excitation is not varied merely to take care of voltage fluctuations as in the ordinary type of alternating-current systems. Another feature of the operation of motors in ship propulsion installations is that the speed of the alternator, as controlled by the speed of the turbine, determines how fast the motors are to run, due to the variation in the frequency of the supply. It might be advisable, for example, to lower the speed of the turbine and therefore the frequency of the system for maneuvering purposes. With my invention the instrument correctly records or corrects variations from a stable range even though the alternator may be driven at varying speeds.

For the embodiment of my invention, I utilize a ratio measuring device adapted to measure the ratio between the current supplied to the machine and the voltage impressed thereon. As will be pointed out later, this ratio serves as an accurate indication of the stable conditions of the machine. If the motor load be of such a character that the motor has too much stability, that is, the maximum output of the motor for the particular value of the excitation of the alternator is not even approached, the ratio of current to voltage is too low; while if the motor is in danger of dropping its load by approaching too near the maximum power output, the ratio of the current to voltage is too high. This ratio measurement may serve either to indicate to the operator that the system needs correction or else may serve to correct the variation automatically by proper contact making devices. The correction of the system to take care of too great deviation from the desirable stability range may be accomplished in any convenient manner. For example, the excitation of one or all of the machines connected with the system may be varied in the proper direction to correct said objectionable deviations. In this application I describe means for varying the exciting current of the alternator, but it may readily be seen that other means substituted for or in addition to the variation in alternator excitation may be employed to accomplish the same result.

In the course of the description further objects and advantages of the invention will be pointed out. The construction and mode of operation of my invention may readily be understood by reference to the accompanying drawings in which.

Figure 6:
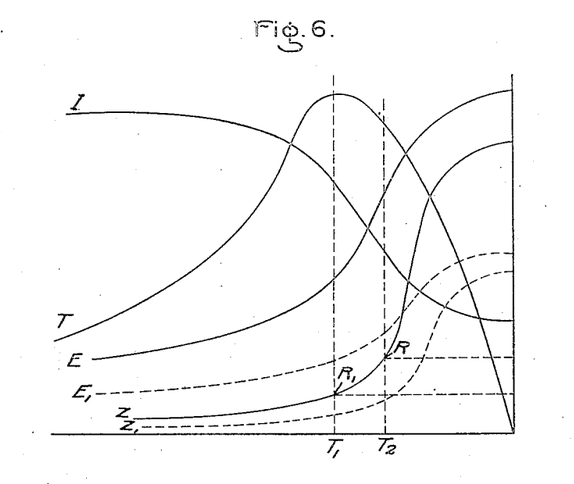
Figs. 6 and 7 are curves showing the operating characteristics of the motor load in order to demonstrate the theory of my invention.
Figure 7:
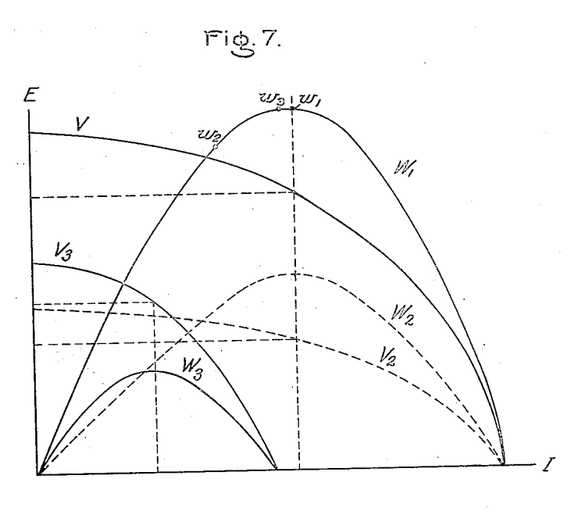

Referring now more in detail to the drawings, in which like reference characters refer to like parts throughout, the theory of my invention may perhaps be best understood by reference to the curves shown in Figs. 6 and 7. Fig. 6 applies to the operating characteristics of an induction motor. In this figure, the right-hand vertical line corresponds to the point of synchronous speed, while the abscissæ show the slip in revolutions per minute, as counted to the left of said vertical line. It can be demonstrated that when quantities are plotted against the slip in revolutions per minute, certain similarities are observed with induction motors provided they are operated from an alternator having a constant excitation but driven at varying speed. For example, the point of maximum torque $T_1$ of the motor torque curve T remains at about the same place, irrespective of the speed of the alternator. This will be further brought out in the discussion. The impressed E. M. F. for a certain definite alternator speed is shown by the curve E, while the current consumption is shown by the curve I. It is seen that as the slip increases the current increases while the applied voltage decreases. For this definite generator speed, the desirable stability range is located between the point $T_1$ of maximum torque and synchronism. When the machine is operating too near the point $T_1$, it may fall out of step and instead of being able to exert a further torque in response to the load requirements, it will instead drop its torque and then finally come to a standstill. A place of good stability is indicated by the line $T_2$ intersecting the torque curve on its downward slope between its maximum point and synchronism. The terminal impedance Z of the entire machine may be plotted as the ratio between E and I. This ratio is shown by the curve labelled Z in the figure. The instrument that I have utilized for the regulation and indication of stability conditions measures this terminal impedance Z. The shapes of the curves as shown in this figure are about what occur in actual practice, and it is found that the curve Z has a comparatively large slope as shown near the desired stable point R. Thus at this point R, which is within the required stability range, a small variation either in one direction or the other of stability will mean a large variation in the terminal impedance, and therefore a controlling instrument is rendered quite sensitive within the desired range. If the terminal impedance for example comes too close to the point $R_1$ where the machine may lose its load, the instrument quickly responds and automatically corrects the conditions so as to bring the machine within the stability range.

Although the instrument is thus far described as measuring the ratio of E and I, another factor must be considered for the proper indication and controlling of the system, since the alternator speed may be varied. When the speed of the alternator is reduced the frequency of the system is correspondingly reduced and we have somewhat different operating conditions than before. In an induction motor the reactance due to self-induction is always much greater than the resistance. When the speed is reduced the frequency of the system is correspondingly reduced and therefore the reactance of the induction motor is reduced in the same ratio. Since at this reduced frequency the ratio of the secondary resistance to the reactance is greater, the torque curve now has its maximum point relatively closer to standstill, but if the torque curve be plotted against slip revolutions per minute, as is done in Fig. 6, the maximum point remains in about the same place as before. It may also be shown that the maximum value of the torque is kept about as large as before if the excitation has not been changed. This is due to the fact that the maximum torque varies directly as the square of the impressed E. M. F., and inversely as the frequency and the impedance of the motor. A change in speed affects all these factors, so that the net result is unaltered. We may, therefore, consider that the torque curve T of Fig. 6 applies to all conditions of operation irrespective of speed of the alternator so long as the excitation has not been varied. However, if the speed is reduced, the voltage curve drops in value in the same proportion and is shown by the dotted curve $E_1$. The current curve I, however, stays almost the same due to the reduced impedance of the motor when running at the reduced frequency. The terminal impedance curve is reduced in direct proportion to the frequency and is shown by the dotted curve $Z_1$. Of course the conditions of stable range come at about the same range on the torque curve as before. In this case the terminal impedance is reduced in the same ratio as the frequency, so that my instrument must be so arranged that this change in frequency is automatically taken care of, so that even with the reduced terminal impedance, the instrument will indicate the same amount as before the frequency was reduced. I accomplish this result by making the current-responsive element operate purely in response to variations in current, the voltage-responsive element with which the current-responsive element is to be compared, is made responsive directly to the voltage and inversely to the frequency. Various means may be readily conceived of for accomplishing this result. For example, I may utilize a large inductance in series with the voltage coil. It is evident that when the voltage alone is varied, the effect of said coil varies directly therewith, while if the frequency alone is varied, the effect varies inversely as the frequency. Of course, for the sake of accuracy, the value of this inductance must be relatively large. It is evident that if I make the instrument read the value $\frac{If}{E}$, or $\frac{E}{If}$, no matter by what means, where I is the load current, $f$ the frequency, and E the impressed E. M. F., the instrument will properly indicate the stability conditions of the system.

The operation of the system upon a reduction in excitation may be understood from the following considerations:—Such a change in excitation operates merely as a change of impressed E. M. F. This changes the ordinates of the torque on the curve, but the slip conditions for the stable range and the shapes of the curves are generally the same as before the change in excitation. The ordinates of the current curve are also decreased. The terminal impedance therefore remains the same for the stability range. Whatever variations there may be in the shape of the curves are due to the saturation of the motor and generator iron, but this is rarely large enough an item to warrant consideration.

The curves shown in Fig. 6 are applicable only to an induction motor. However, synchronous motors may be operated from the alternators. The stability indicating and regulating means that I have invented are fully as applicable in this case as in the case of induction motor operation. Fig. 7 shows alternator characteristic curves which apply both to induction motors and synchronous motors. In this case the abscissæ represent current supplied to the machine while the ordinates are power consumed thereby or voltage impressed thereon. The curve V shows the variation of voltage with variation in current at a certain definite excitation and speed of the alternator. The point where the voltage curve intersects the line of abscissæ indicates short circuit conditions. The power curve $W_1$ is plotted to show the power consumed by the motor and is the product of the volts and current and the power factor which for the purposes of this discussion is assumed constant for the entire range. This power curve $W_1$ has a maximum point $w_1$. Any attempt to load the motor further results in an increase in the current flow but such a rapid decrease in the voltage supplied that the actual power consumed by the motor is reduced. It is desirable, of course, to prevent the motors from ever operating dangerously close to the point of maximum power output $w_1$. The stability range, as a matter of fact, should be about between the points $w_2$ and $w_3$. Assume now that the speed of the alternator has been reduced with the excitation and power factor remaining the same as before. The E. M. F. curve now takes on the shape shown by the dotted curve $V_2$. The reduction of the E. M. F. is proportional to the reduction in speed. The terminal impedance of the motor circuit is correspondingly reduced since the frequency is reduced, so that for the same current flow there need be a smaller E. M. F. impressed upon the machine. The short circuit current is as large as before, and is shown by the fact that the dotted curve $V_2$ crosses the I axis at the same point as the curve V. The power curve is now shown by the dotted curve $W_2$. The maximum point of power consumption requires the same flow of current as before the reduction in speed. The terminal impedance is reduced since the ratio of E to I is reduced. However, if my instrument measures the ratio between current and a quantity varying directly as the voltage and inversely as the frequency, it serves to indicate deviations from the proper stability range even for a reduction in alternator speed.

Assume now that the excitation of the alternator is reduced without a variation in the speed. When this excitation is reduced, the voltage is reduced without any reduction in the reactance. Therefore the short circuit current is correspondingly reduced as well as the output. The point at which the new voltage curve $V_3$ crosses the I axis is now closer to the E axis. The power output under such circumstances is represented by the curve $W_3$. The instrument again indicates the deviation from the proper stability range, since in this case the voltage and the current are both reduced almost proportionately to the excitation.

This foregoing discussion of course has been rather elementary, since the variation in the operating characteristics of the machines depend not only upon the excitation and speed of the alternator but also upon the requirements of the load, and more than one condition may be simultaneously varied. For example, in ship propulsion installations, the propeller motors may be operating on a stable range when the frequency is high, but when the speed is reduced with a corresponding reduction in frequency, there is a deviation from the stable range, if the excitation is kept constant, due to the fact that the torque required by the load is reduced as the square of the speed. A mere reduction in the speed of the motor does not reduce the motor torque in any such ratio. Therefore it is quite possible that a reduction in the speed of the alternator will cause the current consumption of the motor to be so much reduced as to cause the motor to be too stable, which will be properly indicated or corrected by the instrument that I have devised for these functions.

Figure 1:
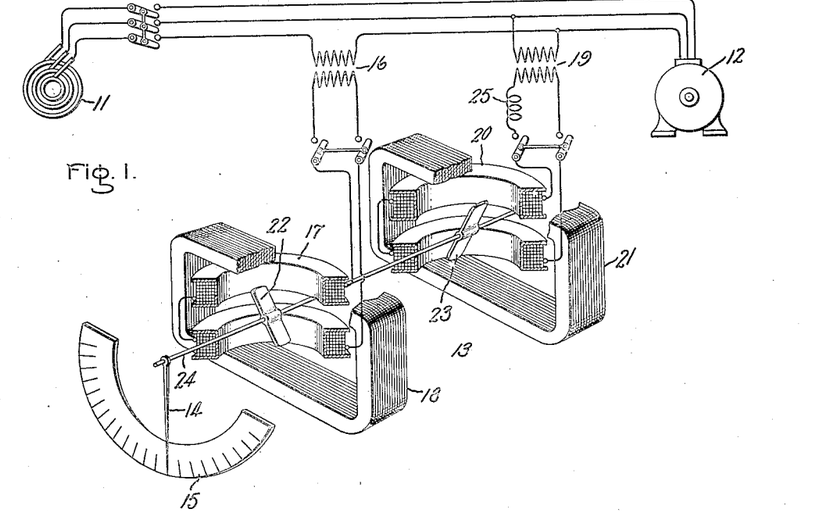
Fig. 1 is a view, partly diagrammatic, of an instrument for indicating the motor stability in an installation comprising an alternator and a motor load.

In Fig. 1 there is shown a system of the sort discussed in which the alternator 11 is adapted to supply power to a motor 12 either of the synchronous type or of the induction motor type. The instrument 13 in this instance is shown merely as an indicating instrument having a pointer 14 and coopérating scale 15. The power for the instrument is taken off by means of transformers but direct connection to the system may be employed if desired. The current transformer 16 supplies current to the stationary coils 17 arranged one above the other as shown and having a magnetic shield 18. The potential transformer 19 is adapted to supply current to a pair of coils 20 displaced from the aforementioned coils 17 but entirely similar thereto and also having a magnetic shield 21. Located within the influence of the field produced by coils 17 is an element 22 shown in this case as a magnetic vane. The coils 20 have a corresponding element 23 adapted to respond to the influence of the field produced by coils 20. These vanes are conveniently carried as shown by a longitudinally extending freely rotatable shaft 24. The plane of the two vanes 22 and 23 each pass through the axis of the shaft 24 but are displaced from each other by an angle of about 75 or 80 degrees. The lines of force produced by the coils 17 tend to rotate the shaft 24 in a clockwise direction, while those produced by the coils 20 tend to rotate the shaft in a counter-clockwise direction. The particular arrangement as herein described need not be adhered to so long as the coils 17 and 20 exert opposing influences upon a freely movable member so that the movement of the member itself is determined by the relative forces exerted by the two sets of coils. In series with the voltage coils 20 is a coil 25 having a comparatively large inductance. However, if the coil 20 itself has a sufficiently large inductance an external inductance may be entirely obviated but in this instance it is shown for the purpose of emphasizing the need of this property in the circuit of the coils 20. The pointer 14 is carried at one end of the shaft and serves as a convenient means for indicating the ratio of the effects produced by the two sets of coils 17 and 20. Any other means may be utilized and in fact the magnetic vanes and coils are merely one of the convenient means for measuring the ratio of the current and the voltage of the system. It is evident that the current coil 17 produces an effect proportional to the current flow in the system, while the effect produced by coil 20 is proportional to the quantity $E$ divided by $f$ where $E$ is the voltage and $f$ the frequency of the system. The instrument 13 therefore measures the ratio between the current and a quantity directly proportional to the voltage and inversely proportional to the frequency. As pointed out in the explanation of the curves shown in Figs. 6 and 7, a variation in this ratio indicates a variation in the stability conditions, and the scale 15 may be so arranged that the range of stability falls at about the center of the scale and a deviation therefrom shows the operator that corrective influences must be brought into play to bring the pointer back to the stable range. Proper switching devices are used at appropriate places in the system, as shown.

Figure 2:
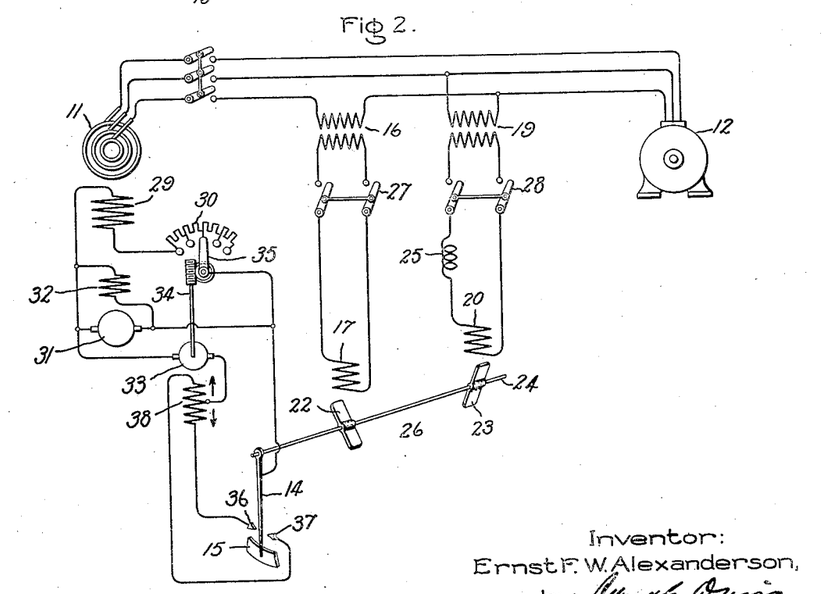
Fig. 2 is a wiring diagram of a system essentially the same as that shown in Fig. 1 but in which the instrument is adapted to correct automatically the motor stability conditions as well as to indicate them.

In the system shown in Fig. 2, there is shown an instrument 26 operating substantially as instrument 13 of Fig. 1 except that it also serves to correct automatically the deviations from the stable range. The current transformer 16 and potential transformer 19 are shown as adapted to be connected through the switches 27 and 28 to the coils 17 and 20. The inductance 25 is again diagrammatically represented as separate and distinct from the coil 20. The shaft 24 in this case serves to operate an appropriate contact making device. In this instance the contact making device is incorporated in the pointer 14 which cooperates with a scale 15 as before. This contact making device is adapted to control an auxiliary circuit whereby the instrument shaft 24 is brought back to the stable range, which indicates that the system is again operating between the desired points of stability. To accomplish this result there is shown a regulating scheme for one of the exciting circuits of the system. The alternator 11 has an exciting field 29 having in series therewith a rheostat 30. Said exciting field and rheostat are connected across the terminals of a small direct current exciter 31 appropriately driven, for example by the same means as the alternator 11. The field of the exciter is diagramatically illustrated at 32.

Means, such for example, as a pilot motor 33, serves to rotate the shaft 34 which operates the rheostat arm 35. This pilot motor is fed from any convenient source of current and as shown is adapted to be supplied from the terminals of the exciter 31. Deviation from the stability range causes the pilot motor to rotate in the proper direction so as to increase or decrease the excitation of the alternator to restore the operating conditions within the stable range. The pilot motor in this instance is shown as being adapted to be driven in one direction or the other in response to the contact making pointer 14, when said pointer contacts with either of the stationary points 36 or 37. The series field 38 is split up into two parts, and when contact is made between 36 and 14 the lower portion of the pilot motor field is active while when the contact at 37 is made the upper portion is active. The magnetomotive force of these two fields are opposed as indicated by the arrows, so that the direction of rotation of the small pilot motor is dependent upon which section of the field is active. It is evident that upon a deviation from the stability range the proper corrective effects are produced by the contact making mechanism so as to restore conditions within that range. A variation in the excitation of the alternator is used in this case to accomplish that result.

Assume now that the motor is used to drive the propeller of an electrically driven ship. If it is desired to slow down the vessel for maneuvering purposes, the speed of the turbine is reduced and consequently the frequency of the system. The reduction in speed of the vessel without any reduction in the excitation causes the motor to draw much less current than before, due to the peculiar nature of the load, and thus to operate at a point on the power curve too far removed from the maximum point. This means that there is too much excitation on the alternator. This excess excitation may not ordinarily be harmful but due to the reduced speed of the alternator itself the exciting coils thereon will not be so well ventilated as before. Therefore there is a likelihood of overheating. Another reason why the motor should be made to operate near its maximum point of power consumption is that in almost all dynamo-electric machinery, the greatest efficiency is obtained near that point and it is therefore most economical to operate machines within the range indicated.

Figure 3:
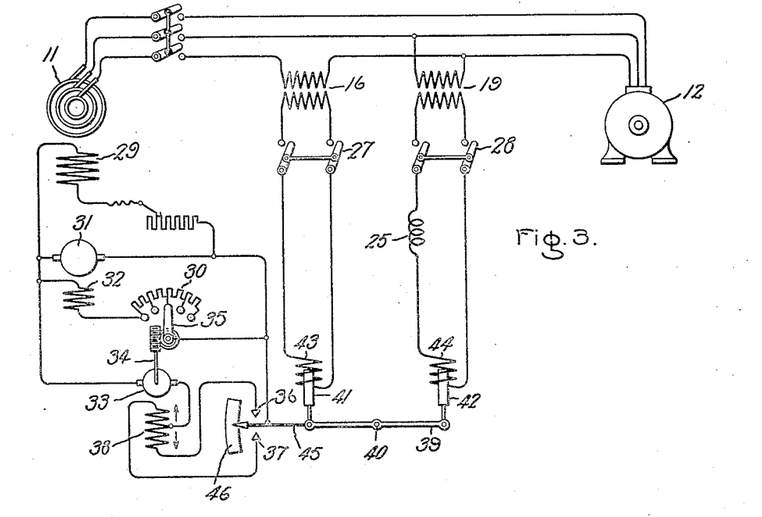
Fig. 3 shows a modified form of the instrument for accomplishing the same results as that in Fig. 2.

In Fig. 3, there is indicated a system similar to that in Fig. 2. The parts that correspond to the parts shown in Fig. 2 are correspondingly numbered. Another type of instrument is here indicated. In this case a lever 39 is shown as pivoted near its central point about the pivot 40. It carries at its extremities a pair of cores 41 and 42 which are actuated by solenoids 43 and 44 connected in the same way as coils 17 and 20 in the former figures. It is evident from this construction that the position of the lever depends upon the ratio of the effect of coils 43 and 44. This instrument may also carry an indicating pointer 45 cooperating with a scale 46 and stationary contact points 36 and 37 entirely similar to the contact points shown in Fig. 2. In this case, however, the control is effective by controlling the excitation circuit of the exciter 31. The pilot motor is adapted to operate a rheostat 30 in series with the exciter field 32. In this way a smaller rheostat may be used as well as a smaller pilot motor. However, the theory of control is the same as that of Fig. 2.

Figure 4:
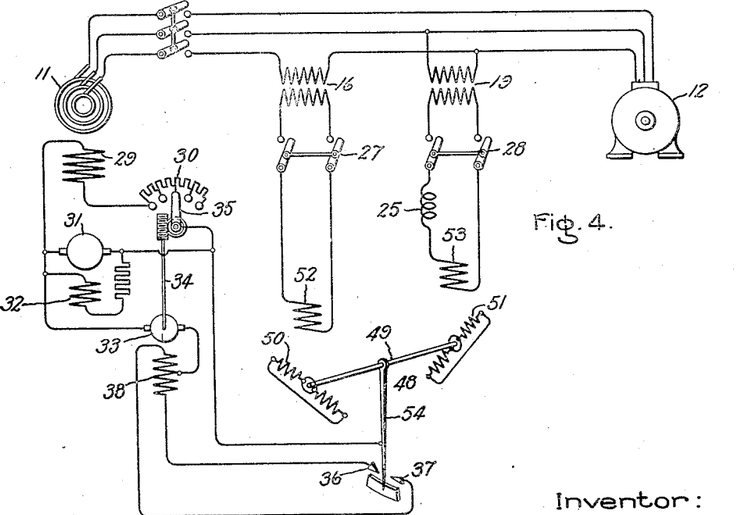
Fig. 4 is a further modification.

In Fig. 4 the system shown is similar to that already described except for a different form of instrument 48. In this case the horizontally arranged shaft 49 of the instrument carries at one extremity a short circuited coil 50 such as a single-phase wound rotor of an induction motor. A similar coil 51 is placed at the other extremity of shaft 49 but the axes of these two coils are displaced from each other as shown. The stationary coils 52 and 53 have effects similar to those of coils 17 and 20. A torque is exerted just as in a single-phase induction motor with a single-phase wound rotor between the stationary coils 52 and 53 and the movable coils 50 and 51. These torques, due to the displacement of the axes of the movable coils 50 and 51, are opposed to each other, and when balanced the pointer 54 of the instrument stays stationary. In all other respects this system operates as those already described.

Figure 5:
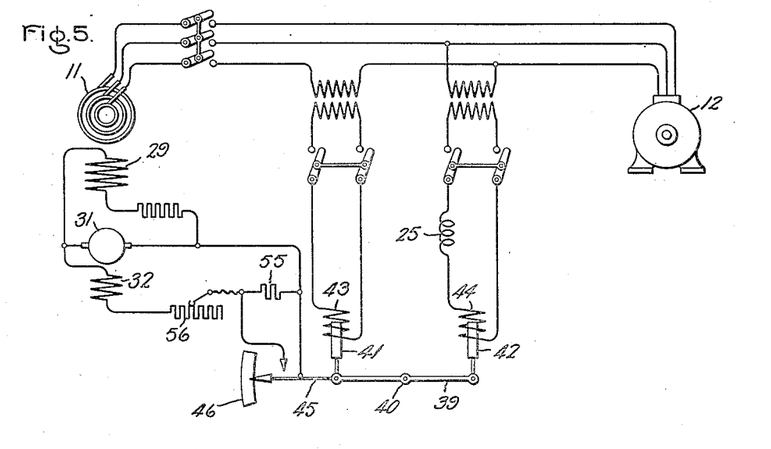
Fig. 5 shows the same type of instrument as Fig. 3 but adapted to control the auxiliary regulating circuit in a slightly different manner.

In Fig. 5 there is shown a sligthly different controlling scheme. In this case the use of the pilot motor is obviated. The same type of instrument is shown as in Fig. 3 but instead of controlling the direction of rotation of a small pilot motor, a relatively small resistance 55 is adapted to be shunted by the contact making device. This resistance is shown as being in series with the exciter field 32. The action of the contact making device in this case causes a vibration or fluctuation thereof, similar in many ways to a vibratory voltage regulator. The resistance 56 is so proportioned with respect to the small resistance 55 that when this latter resistance is short circuited the excitation is too great for the proper stability range, while when it is open circuited there is too little excitation for the system. The actual effective excitation thus falls between the two extreme values, as is well understood. This illustrated variation upon the control schemes shown indicates that the contact making device may be utilized in a large number of ways to accomplish the purposes of my invention. It is evident, for example, that the contact making device may be utilized to control any other auxiliary circuit so long as it performs the proper steps for restoring the stability of the system. With an induction motor load, however, the most feasible method of control is that shown by the various figures.

While I have shown in the accompanying drawings the preferred embodiments of my device, my invention is not limited thereto, and I aim in the appended claims to embrace all modifications falling fairly within the scope of my invention.

What I claim as new and desire to secure by Letters Patent of the United States, is:—

1. In an electric system, a source of alternating current, a motor load supplied thereby, and means responsive to the characteristics of the motor load for indicating directly the degree of stability of the motor load.

2. In an electric system, a source of alternating current, a motor load supplied thereby, and means responsive to the characteristics of the motor load for maintaining the motor load within a stable range by regulating said source.

3. In an electric system, a source of alternating current, a motor load supplied thereby, auxiliary circuits adapted to regulate the characteristics of the motor load by regulating said source, and means responsive to the variation from the stable range of the motor load for regulating said auxiliary circuits to maintain the motor load within said stable range.

4. In an electric system, an alternator, a motor supplied thereby, an exciting circuit for one of said machines, and means responsive to a variation of the characteristics of the motor load from a stable range for controlling said exciting circuit to maintain the load within said stable range.

5. In an electric system, a source of alternating current, a motor load supplied thereby, and means responsive to the characteristics of the motor load for indicating and correcting stability of the motor load.

6. In an electric system, an alternator driven at varying speeds, a motor load supplied thereby, an exciting circuit for said alternator, and means responsive to a variation from a stable range of said motor load for regulating said exciting circuit to maintain the motor load within said stable range irrespective of the speed of the alternator.

7. In an electric system, an alternator driven at varying speeds, a motor load supplied thereby, an element responsive to the current supplied to said load, an element responsive directly to the voltage supplied to said load and inversely to the frequency of the system, and means cooperating with said two elements to measure the ratio between their effects.

8. In an electric system, an alternator driven at varying speeds, a motor load supplied thereby, an auxiliary circuit adapted to regulate load conditions, an element responsive to the current supplied to said load, an element responsive directly to the voltage supplied to said load and inversely to the frequency of the system, and regulating means for said auxiliary circuit responsive to variations in the ratio between the effects of said two elements, for maintaining the motor load within a stable range.

9. In an electric system, an alternator driven at varying speeds, a motor load supplied thereby, an auxiliary circuit adapted to regulate load conditions, an element responsive to the current supplied to said load, an element responsive directly to the voltage supplied to said load and inversely to the frequency of the system, and means responsive to variations in the ratio between the effects of said two elements, for indicating load conditions, and for regulating said auxiliary circuit for maintaining the motor load within a stable range.

10. In an instrument, a current coil, a circuit of sufficiently high inductance as to be responsive to changes in frequency comprising a voltage coil, and indicating means responsive to the ratio between the effects of said two coils.

11. In an instrument, a current coil, a circuit of sufficiently high inductance as to be responsive to changes in frequency comprising a voltage coil, means responsive to the ratio between the effects of said two coils, and contacts controlled by said latter means upon variations in said ratio.

12. In an instrument, a pivoted member, a current coil tending to rotate said member in one direction, a circuit of sufficiently high inductance as to be responsive to changes in frequency comprising a voltage coil tending to rotate said member in the opposite direction, and indicating means operated by said pivoted member.

13. In an instrument, a pivoted member, a current coil tending to rotate said member in one direction, a circuit of sufficiently high inductance as to be responsive to changes in frequency comprising a voltage coil tending to rotate said member in the opposite direction, and contact making means operated by said pivoted member.

14. In an instrument, a pivoted shaft, a pair of magnetic vanes supported on said shaft, the planes of said vanes passing through the axis of the shaft, and making an angle approximating 90° with each other, a current coil cooperating with one of said vanes tending to rotate it in one direction, a circuit of relatively high inductance comprising a voltage coil cooperating with the other of said vanes tending to rotate it in the opposite direction, and indicating means operated by said pivoted shaft.

15. In an instrument, a pivoted shaft, a pair of magnetic vanes supported on said shaft, the planes of said vanes passing through the axis of the shaft, and making an angle approximating 90° with each other, a current coil cooperating with one of said vanes tending to rotate it in one direction, a circuit of relatively high inductance comprising a voltage coil cooperating with the other of said vanes tending to rotate it in the opposite direction, contact making means operated by said pivoted shaft.

16. In an electric system, an alternator driven at varying speeds, an exciting circuit for said alternator, a motor load supplied by said alternator, a coil responsive to the current supplied to said load, a circuit having a relatively high inductance having a coil responsive to the voltage supplied to said load, and means responsive to the ratio between the effects of said two coils for varying the exciting circuit of said alternator.

17. In an electric system, an alternator driven at varying speeds, an exciting circuit for said alternator, a motor load supplied by said alternator, a pivoted member, a coil responsive to the current supplied to said load tending to rotate said member in one direction, a circuit of relatively high inductance having a coil responsive to the voltage supplied to said load tending to rotate said member in the opposite direction, and means for varying the exciting circuit of said alternator operated by said pivoted member.

18. In an electric system, an alternator driven at varying speeds, an exciting circuit for said alternator, a motor load supplied by said alternator, a pivoted shaft, a pair of magnetic vanes supported on said shaft, the planes of said vanes passing through the axis of the shaft, and making an angle approximating 90° with each other, a coil responsive to the current supplied to said load cooperating with one of said vanes tending to rotate it in one direction, a circuit of relatively high inductance having a coil responsive to the voltage supplied to said load, cooperating with the other of said vanes tending to rotate it in the opposite direction, and means operated by said pivoted shaft for varying said exciting circuit of said alternator.

19. In an alternating current system comprising an alternator driven at varying speeds, an exciting circuit therefor, and a motor load supplied thereby, the method of preventing deviation beyond stability range of the motor load which consists in measuring the ratio between the current supplied to said load, and a quantity directly proportional to the voltage supplied to said load and inversely proportional to the frequency of the system, and varying the exciting circuit in response to a deviation from said ratio.

20. In an alternating current system comprising an alternator, a motor load supplied thereby, and an auxiliary circuit adapted to regulate load conditions, the method of preventing deviation beyond stability range of the motor load which consists in measuring the ratio between the current supplied to said load and the voltage impressed thereon, and regulating said auxiliary circuit in response to a deviation from said ratio.

21. In an electric system, an alternator driven at varying speeds, a motor load supplied thereby, and means responsive to the quantity $\frac{If}{E}$ for indicating stability of the motor load, where $f$ is the frequency of the system, $I$ the current flow therein, and $E$ the voltage impressed upon the motor load.

22. In an electric system, an alternator driven at varying speeds, a motor load supplied thereby, and means responsive to $\frac{If}{E}$ for maintaining the motor load within a stable range, where $f$ is the frequency of the system, $I$ the current flow therein, and $E$ the voltage impressed upon the motor load.

23. In an electric power system, an adjustable speed dynamo electric generating electric machine of the synchronous type, a load driving dynamo electric machine supplied thereby, and means for regulating the excitation of one of said machines to prevent the motor from falling out of step comprising a coil connected to respond to generator voltage and a reactor in circuit with said coil to maintain the current therethrough substantially constant for changes in generator voltage due to changes in generator speed.

In witness whereof, I have hereunto set my hand this 22d day of March, 1920.

ERNST F. W. ALEXANDERSON.